US008911861B2

(12) United States Patent
Parker et al.

(10) Patent No.: US 8,911,861 B2
(45) Date of Patent: Dec. 16, 2014

(54) THERMOCHROMIC INDICATOR

(75) Inventors: Robert Parker, Bend, OR (US); Julian E. Schafer, Montara, CA (US); Steven P. Bitler, Menlo Park, CA (US)

(73) Assignee: Landec Corporation, Menlo Park, CA (US)

( * ) Notice: Subject to any disclaimer, the term of this patent is extended or adjusted under 35 U.S.C. 154(b) by 0 days.

(21) Appl. No.: 12/653,294

(22) Filed: Dec. 11, 2009

(65) Prior Publication Data

US 2010/0247900 A1  Sep. 30, 2010

Related U.S. Application Data

(60) Provisional application No. 61/201,506, filed on Dec. 11, 2008.

(51) Int. Cl.
| | | |
|---|---|---|
| *B32B 5/16* | (2006.01) | |
| *C09D 5/00* | (2006.01) | |
| *G01K 11/16* | (2006.01) | |
| *G01K 11/18* | (2006.01) | |

(52) U.S. Cl.
CPC ................................. *G01K 11/165* (2013.01)
USPC ............................ 428/327; 428/323; 252/586

(58) Field of Classification Search
None
See application file for complete search history.

(56) References Cited

U.S. PATENT DOCUMENTS

| | | | | |
|---|---|---|---|---|
| 2,269,038 | A | | 1/1942 | Perry |
| 2,799,167 | A | | 7/1957 | Loconti |
| 2,928,791 | A | | 3/1960 | Loconti |
| 4,248,089 | A | | 2/1981 | Heinmets |
| 4,299,727 | A | | 11/1981 | Hof et al. |
| 5,152,611 | A | | 10/1992 | Piper |
| 5,622,137 | A | | 4/1997 | Lupton |
| 5,667,303 | A | * | 9/1997 | Arens et al. ................... 374/102 |
| 5,686,153 | A | * | 11/1997 | Heynderickx et al. ....... 428/1.32 |
| 5,709,472 | A | | 1/1998 | Prusik et al. |
| 5,721,059 | A | | 2/1998 | Kito et al. |
| 5,783,302 | A | * | 7/1998 | Bitler et al. ................... 428/343 |
| 6,042,264 | A | | 3/2000 | Prusik et al. |
| 6,255,367 | B1 | * | 7/2001 | Bitler et al. ................... 523/522 |
| 6,382,125 | B1 | | 5/2002 | Tamura |
| 6,420,184 | B1 | | 7/2002 | Hof |
| 6,586,751 | B1 | | 7/2003 | Pichon |
| 6,773,637 | B1 | | 8/2004 | DiSalvo et al. |
| 6,979,120 | B1 | | 12/2005 | Wolfe |
| 7,364,357 | B2 | | 4/2008 | Wu |
| 7,517,146 | B2 | | 4/2009 | Smith et al. |
| 2001/0007881 | A1 | * | 7/2001 | Bitler et al. ................... 523/136 |
| 2005/0139142 | A1 | | 6/2005 | Kelley |
| 2006/0232059 | A1 | | 10/2006 | Fortune |
| 2006/0249949 | A1 | | 11/2006 | Fortune |
| 2007/0207280 | A1 | | 9/2007 | Wolfe |
| 2008/0195089 | A1 | | 8/2008 | Thiagalingam |
| 2008/0229971 | A1 | | 9/2008 | Wolfe |

FOREIGN PATENT DOCUMENTS

| | | |
|---|---|---|
| EP | 0042285 A1 | 12/1981 |
| EP | 0138741 | 4/1985 |
| JP | 2007119634 A * | 5/2007 |
| WO | WO 9811166 A1 * | 3/1998 |

OTHER PUBLICATIONS

International Search Report and Opinion on PCT/US 2009/006503, Apr. 30, 2010.
Search Report By Washpat LLC, Mar. 16, 2010.

* cited by examiner

*Primary Examiner* — Monique Jackson
(74) *Attorney, Agent, or Firm* — James S. McDonald; Timothy Richardson

(57) ABSTRACT

A thermochromic indicator includes a coating on the substrate. The coating comprising a solid crystalline particles having a melting point of 0-130° C. At temperatures below the melting point, the coating is opaque. At temperatures above the melting point, the coating becomes translucent. The change in opacity can be reversible or irreversible.

19 Claims, No Drawings

THERMOCHROMIC INDICATOR

CROSS-REFERENCE TO RELATED APPLICATION

This application claims priority from U.S. Provisional Application No. 61/201,506, filed Dec. 11, 2008. The entire disclosure of that application is incorporated by reference herein for all purposes.

BACKGROUND OF THE INVENTION

A number of different thermochromic indicators have been proposed in the past; see for example U.S. Pat. No. 2,799,167, the entire disclosure of which is incorporated by reference herein for all purposes.

SUMMARY OF THE INVENTION

In a first aspect, this invention provides novel thermochromic indicators which comprise
(1) a solid substrate, and
(2) a coating on the substrate, the coating comprising particles which
  (a) comprise a solid crystalline material having a crystalline melting point, Tp, of 0-135° C., e.g. 35-105° C.,
  (b) when the coating is a temperature below Tp, cause the coating to have opacity resulting from the scattering of visible light, and
  (c) when the coating is heated from a temperature below Tp to a temperature above Tp, melt and thus decrease the opacity (i.e. increase the translucency) of the coating.

In a second aspect, this invention provides novel methods of making thermochromic indicators in which compositions comprising particles of a solid crystalline material having a Tp of 0-135° C., e.g. 35-105° C., are deposited on, or formed on, a solid substrate.

In a third aspect, this invention provides novel methods of determining whether an object is at a temperature above (or below) a predetermined temperature, or has at some previous time been at a temperature above (or below) a predetermined temperature, making use of a thermochromic indicator comprising particles of a solid crystalline material having a Tp at the predetermined temperature.

DETAILED DESCRIPTION OF THE INVENTION

In the Summary of the Invention above and in the Detailed Description of the Invention, the Examples, and the Claims below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in combination with and/or in the context of other particular aspects and embodiments of the invention, and in the invention generally.

The term "comprises" and grammatical equivalents thereof are used herein to mean that other elements (i.e. components, ingredients, steps etc.) are optionally present. For example, a structure "comprising" (or "which comprises") components A, B and C can contain only components A, B and C, or can contain not only components A, B and C but also one or more other components.

The terms "a", "an" and "the" before an item are used herein to mean that there can be a single such item or two or more such items, unless the context makes this impossible. The term "consisting essentially of" and grammatical equivalents thereof is used herein to mean that other elements may be present which do not materially alter the disclosed invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 2 to 16 mm" or "2-16 mm." means a range whose lower limit is 2 mm and whose upper limit is 16 mm. The numbers given herein should be construed with the latitude appropriate to their context and expression. The term "plurality" is used herein to mean two or more.

In describing and claiming the invention below, the following abbreviations, definitions, and methods of measurement (in addition to those already given) are used.

Parts and percentages are by weight, except where otherwise noted. Temperatures are in degrees Centigrade. For crystalline materials, the abbreviation $T_o$ is used to mean the onset of melting, the abbreviation $T_p$ is used to mean the crystalline melting point, and the abbreviation $\Delta H$ is used to mean the heat of fusion. $T_o$, $T_p$ and $\Delta H$ are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

The abbreviations Mn and Mw are used to denote number average and weight average molecular weight in daltons, respectively, measured in tetrahydrofuran using size exclusion chromatography, configured with a Wyatt laser light scattering detector The abbreviation CxA is used to denote an n-alkyl acrylate in which the n-alkyl group contains x carbon atoms, the abbreviation Cx alkyl is used to denote an n-alkyl group which contains x carbon atoms, and the abbreviation CxM is used to denote an n-alkyl methacrylate in which the n-alkyl group contains x carbon atoms. Other abbreviations are given elsewhere in the specification.

The side chain crystalline (SCC) polymers used in the present invention can be homopolymers, or copolymers of two or more comonomers, including random copolymers, graft copolymers and block copolymers (including thermoplastic elastomers). The presence of units derived from comonomers containing functional groups can be useful in improving the compatibility of the SCC polymer with a matrix polymer and/or in changing the refractive index of the SCC polymer. Two or more SCC polymers can be used together. The number average molecular weight of the SCC polymer is for example from 10,000 to 1,500,000. The molecular weight of an SCC polymer is relatively unimportant to its $T_p$, whereas it is generally an important factor in determining the $T_p$ of other polymers.

The SCC polymers preferably used in the present invention are in themselves well known. Publications describing SCC polymers include U.S. Pat. Nos. 4,830,855, 5,120,349, 5,156,911, 5,129,180, 5,156,911, 5,254,354, 5,387,450, 5,412,035, 5,469,867, 5,752,926 5,665,822, 5,783,302, 5,752,926, 5,807,291, 5,469,867, 5,826,584, 6,013,293, 6,060,540, 6,199,318, 6,210,724, 6,224,793, 6,255,367, 6,376,032, 6,492,462, 6,540,984, 6,548,132, 6,831,116, 6,989,417 and 7,101,928, US Publication will Numbers 2001/0018484, 2002/0090425 and 2002/0127305, J. Poly. Sci. 60, 19 (1962), J. Poly. Sci, (Polymer Chemistry) 7, 3053 (1969), 9, 1835, 3349, 3351, 3367, 10, 1657, 3347, 18, 2197, 19, 1871, J. Poly. Sci, Poly-Physics Ed 18 2197 (1980), J. Poly. Sci, Macromol. Rev, 8, 117 (1974), Macromolecules 12, 94 (1979), 13, 12, 15, 18, 2141, 19, 611, JACS 75, 3326 (1953), 76; 6280, Polymer J 17, 991 (1985); and Poly. Sci USSR 21, 241 (1979). The entire disclosure of each of those United States patents is incorporated in this specification by reference.

The SCC polymer may for example be derived from one or more acrylic, methacrylic, olefinic, epoxy, vinyl, ester-containing, amide-containing or ether-containing monomers. Preferred SCC polymers comprise repeating units in which the side chains comprise linear polymethylene radicals containing 12 to 50, e.g. 16-30, carbon atoms and/or at least 5, e.g. 5 to 49, preferably at least 8, linear perfluorinated or substantially perfluorinated methylene moieties and a terminal perfluoromethyl moiety or hydrogen atom. The greater the number of linear polymethylene radicals, the higher the Tp of the polymer. Specific examples of suitable crystalline alkyl moieties include C14, C16, C18, C20, C22, C30, C40 and C50 alkyl.

In some examples of the invention, the SCC polymer is a copolymer which comprises, optionally consists essentially of, repeating units containing an n-alkyl group which contains 12, 14, 16 or 18 carbon atoms. For example, the SCC polymer can be a copolymer which consists essentially of units derived from two comonomers, the comonomers being C12A (i.e. the n-alkyl acrylate in which the alkyl group contains 12 carbon atoms) and C16A (i.e. the n-alkyl acrylate in which the alkyl group contains 16 carbon atoms).

In some examples of the invention, the SCC polymer consists essentially of units derived from
(i) at least 50% by weight of at least one n-alkyl acrylate or methacrylate in which the n-alkyl group contains 12-50 carbon atoms, and
(ii) less than 50% by weight of at least one alkyl acrylate or methacrylate in which the alkyl group is not an alkyl group containing 12-50 carbon atoms.

Optionally, the SCC polymer is cross-linked. When the SCC polymer is not cross-linked, it generally has a flow point which is 2-6° C. above its crystalline melting temperature, Tp. The flow point of a material is the temperature at which the viscosity is low enough for the material to flow after it has been brought through its melting range at a temperature rise of 10° C./minute. When a temperature indicator comprising an SCC polymer which is not cross-linked is heated above Tp, the SCC polymer flows and causes the temperature indicator to undergo a change. In some cases, the change simply indicates that the temperature indicator is at a temperature above a predetermined temperature. In other cases, the change is irreversible and shows that at some previous time, the temperature indicator was exposed to a temperature above a predetermined temperature or to a predetermined combination of time and temperature.

The Tp of the Crystalline Particles.

The Tp of the crystalline particles, and the temperature range over which melting takes place, determines the temperature range over which the opacity of the coating on the substrate will change. The Tp can for example be 20-100° C., or 30-70° C., or 40-60° C., The smaller the temperature range over which melting takes place, the more abrupt the change in opacity. Although microcrystalline waxes and other conventional crystalline materials can be used in this invention, such materials often do not have a Tp at the desired level and/or melt over a relatively extended temperature range and/or have only limited crystallinity. An advantage of using SCC polymers is that they can be tailored to have any desired Tp and to melt over a limited temperature range. Thus, the SCC polymers preferably used in this invention preferably have an onset of melting temperature, $T_o$, such that $T_p - T_o$ is less than $T_p^{0.7}$, generally less than $T_p^{0.6}$, $T_o$ and $T_p$ being in ° C., particularly less than 10° C., especially less than 5° C. The crystallinity of the SCC polymer is preferably such that its heat of fusion is at least 20 J/g, particularly at least 40 J/g. Tp is often chosen so that, at ambient temperature, the particles are at a temperature below Tp, in which case the opacity of the coating will decrease when the indicator temperature rises above Tp. However, it is also possible for Tp to be such that, at ambient temperature, the particles are at a temperature above Tp (although they must be solid, for example as a result of cross-linking of the particles themselves and/or of a matrix polymer surrounding them), in which case the opacity of the coating will increase when the temperature falls below Tp.

The Size of the Particles.

The particles must have a size such that the coating, at temperatures below Tp, scatters light.

Coatings with Small Quantities of a Binder.

In some embodiments, the coating consists essentially of the crystalline particles, air voids and a small quantity, e.g. 5-40% by weight of the coating, of a binder. The binder can for example be a polymer having a Tg at least 10° C. below the Tp of the crystalline polymer, and optionally having a minimum film forming temperature (MFFT) less than 0° C., preferably between −30° C. and 0° C., and optionally having been formed by partial coalescence of binder polymer particles having a size less than 0.15µ, preferably less than 0.12µ, particularly less than 0.10µ.

This type of coating, once it has been made translucent by heating above Tp, is irreversible, i.e. remains translucent even after cooling below Tp. The coating contains, for example, 60-90%, preferably 70-80%, by weight of the particles. Such a coating can be formed by depositing a liquid composition containing the particles onto the substrate, and solidifying the composition at a temperature below Tp. The light scattering produced by such a coating depends upon the difference in refractive index between the crystalline particles and the air in the voids, which is high, and the concentration of the particles, which is also high. Consequently, the thickness of the coating can be quite small. For example, the thickness can be at least 0.025 mm or at least 0.05 mm, for example least 0.1 mm, e.g. can be 0.1-0.2 mm. In this embodiment, a small range of particle sizes is desirable because it improves light scattering efficiency by maximizing void volume. For example, the particles can have a median particle size, p, which is (a) less than 10μ, preferably less than 5μ, and (b) greater than 0.03μ, preferably 0.3 to 2μ, for example 0.5 to 1.0μ, particularly 0.7 to 0.8μ; and preferably at least 90% of the particles have a size between 0.8 p and 1.2 p, for example between 0.9 p and 1.1 p, particularly between 0.95 p and 1.05 p.

However, this type of coating is often fragile and for many uses may require a protective coating. A more robust coating of this kind can be prepared by making use of particles composed of a core-shell polymer, with the core being the polymer having the desired Tp, and the shell being a polymer which permits partial coalescence of particles during solidification of the liquid composition.

Coatings in which the Particles are Dispersed in a Matrix Polymer.

In other embodiments, the crystalline particles are dispersed in a matrix polymer. The coating can for example contain 20-70%, e.g. 40-65% or 50-60%, by weight of the particles. If the particles remain substantially intact in the matrix polymer at temperatures above Tp, then the thermochromic indicator is reversible, since the particles revert to a crystalline state if the indicator is cooled below Tp. To achieve reversibility, the crystalline particles themselves can be cross-linked, and/or the matrix polymer can be cross-linked. When the particles are dispersed in a matrix polymer, with few if any air voids, the light scattering depends upon the difference in refractive index between the crystalline particles and the matrix polymer. This difference is always much less than the difference between the refractive index of the crystalline particles and air; consequently the thickness of the coating is preferably relatively high in order to obtain a practically useful degree of opacity. For example, the thickness of the coating is preferably at least 1 mm, for example 1-2 mm. At temperatures below Tp, the difference in refractive index is preferably high for maximum opacity, for example at least 0.04 or at least 0.05. However, at temperatures above Tp, the difference is preferably small for maximum translucency. Crystalline materials generally have a refractive index above Tp which is below, for example about 0.03-0.04 below, the refractive index below Tp. Preferably the crystalline particles have a refractive index above Tp which is at least 0.03, particularly at least 0.04, less than the refractive index below Tp, and which is preferably not more than 0.03 greater, particularly not more than 0.02 greater, especially not more than 0.01 greater, than the refractive index of the matrix polymer.

A wide range of matrix polymers can be used in this invention. The matrix polymer should provide a translucent, non-crystalline, continuous matrix throughout the operational temperature of the indicator. For example, when the indicator is to be used to determine a relatively low temperature, the matrix polymer can be chosen primarily with a view to its refractive index and compatibility with the crystalline particles, for example a polyacrylate available from Rohm & Haas (Dow). When higher temperatures are involved, these factors remain important, but it may be necessary to make use of higher melting matrix polymers, e.g. polysiloxanes, for example those available from Dow Corning. The matrix polymers that can be used include polysiloxanes, epoxy resins, polyesters, unsaturated polyesters, polyvinyl esters, polyurethanes, polyacrylates, polymethacrylates and polystyrenes, and combinations of two or more of these.

Optional Ingredients of the Coating.

The coating containing the crystalline particles can contain other conventional ingredients, for example antioxidants, UV stabilizers, extenders, fillers, defoamers which facilitate the application of the coating composition onto the substrate for example by printing. The coating (including the crystalline particles themselves) can also optionally be lightly tinted with dyes or pigments, so that the coating, below Tp, is slightly colored (e.g., light green or yellow or any other color) rather than merely white, and the objective is to produce a coating which, above Tp, is translucent, rather than transparent. Preferably, the coating is produced by coating the substrate by a printing technique.

Substrates.

In some cases, the substrates are colored (including for example printed with a message), so that when the coating becomes translucent, the substrate determines the appearance of the indicator. In other cases, the substrate is transparent or translucent and the indicator is, in use, placed on the top of a colored base (including, again, a printed base), whose color then determines the appearance of the indicator when the coating becomes translucent.

Multiple Coatings.

Multiple coatings, containing crystalline particles having different Tps can be placed on the same substrate, spaced-apart from each other and/or one on top of each other, so that the indicator is triggered in different ways by different temperatures.

Uses of the Temperature Indicators.

The temperature indicators can be used in a wide variety of applications, including for example the following, using for example a Tp as shown.

Reversible.
1. 50-55° C. pot handles—appliances—burning skin warning.
2. 38° C. incubators—heat trace for pipe lines to reduce oil viscosity.
3. 70° C. hair curlers—electric wiring—current breakers.
4. 100° C. steam traps—steam lines—hydraulic lines.
5. 110° C. tire overheating.
6. 1-2° C. black ice road signs—pot dots.
7. Bearings over temp.
8. Nip rollers for heat laminating.
9. 105° C. transformers—power lines.
10. Outdoor temperature display billboards
11. Refrigeration—food processing.

Irreversible.
1. Brake linings over temperature.
2. Vaccine over temperature.
3. Shipping frozen blood—blood bags.
4. Sterilization indicators.
5. Defrost or thaw indicators.
6. Process control.

The invention is illustrated in the following examples. Examples 1-8 show irreversible thermochromic indicators. Examples 9-13 show reversible thermochromic indicators.

Example (1)

Crystalline polymer: 311-88 is a 0.3 micron median particle size anionic crystalline polymer emulsion at 41.9% NV solids neutralized with ammonia to pH 7.2 in 80:20 water:n-propanol with a viscosity of 83 centipoise. The dry polymer, primarily based on a mixture of 92% docosyl acrylate, 6% methacrylic acid and 2% butyl-3-mercaptopropionate, exhibits a strong endotherm at 65° C. when tested by DSC at a 10° C./min heating rate. When coated with 3 wet mils Bird film applicator on a black Leneta chart, the bluish white emulsion dries at room temperature to a semi-gloss white moderately opaque film that is easily rubbed from the chart to a flaky powder. This dry white film, when heated for 2 minutes in a 70° C. oven, becomes mostly transparent whereupon a dense pattern of 0.1-0.2 mm cracks is evident in a slightly adherent but brittle film. When the same 3 mils wet film is dried immediately in the 70° C. oven, it dries quickly to a nearly defect-free transparent and somewhat flexible film that is difficult to rub off.

Example (2)

Crystalline polymer: 319-188 is a 0.8 micron median particle size anionic crystalline polymer emulsion at 51.8% NV solids neutralized with ammonia to pH 7.8 in 83:17 water:n-propanol with a viscosity of 48 centipoise. The dry polymer, based on a mixture of 51% stearyl acrylate, 37% cetyl acrylate, 8% 2-ethylhexyl acrylate, 4% methacrylic acid and 0.5% 1,6-hexanediol diacrylate, exhibits a strong endotherm at 38° C. when tested by DSC at a 10° C./min heating rate. When coated with 3 wet mils Bird film applicator on a black Leneta chart, the opaque white emulsion dries at room temperature to opaque white matte film that is easily rubbed from the chart to a flaky powder. The opaque film, when heated for 5 minutes in a 50° C. oven, becomes mostly transparent whereupon a dense pattern of 0.1-0.2 mm cracks is evident in a slightly adherent but brittle film. When the same 3 mils wet film is dried immediately in the 70° C. oven, it dries quickly to a nearly defect-free transparent and somewhat flexible film that is difficult to rub off.

Example (3)

Binding polymer: N-484 is a 0.1 micron median particle size anionic amorphous styrene-acrylic emulsion polymer at 50.3% NV solids at pH 8.4 in water with a viscosity of 50 centipoise. The dry polymer, based on approximately 69% n-butyl acrylate, 20% methyl methacrylate, 10% styrene and 1% methacrylic acid, exhibits a distinct glass transition at minus 21° C. It air dries to a glossy, somewhat tacky, strongly adherent rubbery transparent film at room temperature with no visible defects.

Example (4)

Thermochromic coating: 319-190 is an irreversible thermochromic coating formulated from the crystalline polymer emulsion 319-188 described in example (2). 130.7 gr of binding polymer N-484 was stirred into 831.4 gr of 319-188 emulsion and followed with 15.6 gr of Acrysol TT-935 thickener pre-diluted with an equal amount of water. To this mixture is added 1.3 gr of Tego Foamex 1488 antifoam and finally 5.4 gr of 14% aqueous ammonia to neutralize and activate the thickener. The resulting coating formulation equilibrates overnight to 1300 centipoise viscosity at 50.5% NV solids and pH 8.2. The polymer portion of this coating is comprised of 86% crystalline polymer, 13.1% binding polymer and 0.9% thickener polymer, or a ratio of 6½ to 1 of crystalline to binding polymer. This coating looks much like a white latex paint and can be applied easily by various standard methods including brush, roller, Bird film applicator etc. It dries to an opaque white semi-gloss film at room temperature with no visible defect other than buffing easily to a higher gloss film. When applied at 3 wet mils on a black Leneta chart, the dry white film almost completely covers the black background. Unlike the unmodified crystalline polymer, this coating adheres well to the chart though it is somewhat soft and can be scraped off as a gum without dusting or flaking. This dry film remains fully opaque with no visible change when heated to 30° C. and 35° C. When placed in a 40° C. oven, however, it changes dramatically in less than 30 seconds completely revealing the black background with no trace of opacity remaining, now adhering to the chart even more strongly than before. On cooling, this film simply gets more rigid, remaining flexible, adherent and as transparent as the film produced when the wet coating is dried at 50° C. never reaches opacity.

Example (5)

Crystalline polymer: 350-112 is a 0.76 micron median particle size anionic crystalline polymer emulsion at 51.0% NV solids neutralized with ammonia to pH 4.8 in 83:17 water:n-propanol with a viscosity of 28 centipoise. The dry polymer, based on a mixture of 93% docosyl acrylate, 4% 2-ethylhexyl acrylate, 2.5% methacrylic acid and 0.5% 1,6-hexanediol diacrylate, exhibits a strong endotherm at 62° C. when tested by DSC at a 10° C./min heating rate. When coated with #60 Meyer rod on a black Leneta chart, the opaque white emulsion dries at room temperature to opaque white but badly cracked film that is easily rubbed from the chart to a fine, flaky powder. The opaque film, when heated for 5 minutes in a 50° C. oven, remains unchanged in appearance but, when the temperature is raised to 74° C., it becomes mostly transparent whereupon a dense pattern of 0.1-0.2 mm cracks is evident in a slightly adherent but brittle film. When the same 3 mils wet film is dried immediately in the 70° C. oven, it dries quickly to a nearly defect-free transparent and somewhat flexible film that is difficult to rub off. When the emulsion was neutralized further with ammonia to pH 8.4, the appearance and viscosity remain unchanged but the degree of cracking was slightly reduced on drying, whether heated or not.

Example (6)

Thermochromic coating: 349-19 is an irreversible thermochromic coating formulated from the crystalline polymer emulsion 350-112 described in example (5). 127.9 gr of binding polymer N-484 was stirred into 807.3 gr of 350-112 emulsion and followed with 19.4 gr of Acrysol TT-935 thickener pre-diluted with 30.5 gr of water. To this mixture was added 1.0 gr of Tego Foamex 1488 antifoam and finally 14.0 gr of 14% aqueous ammonia to neutralize and activate the thickener. The resulting coating formulation, at 48.1% NV solids and pH 8.0, equilibrated overnight to a thixotropic white paint with 1292 centipoise viscosity @ 60 rpm and 3670 centipoise @ 12 rpm (Brookfield LVT, #3 spindle @ 20° C.). The polymer portion of this coating is comprised of 85.4% crystalline polymer, 13.4% binding polymer and 1.2% thickener polymer, or a ratio of 6.4 to 1 of crystalline to binding polymer. The coating, applied at 3 wet mils with Bird film applicator to a black Leneta chart, dried to an opaque white to a low sheen film at room temperature with a few barely visible cracks at the edges. The somewhat brittle coating adhered well to the chart and could be scraped off as small flakes. When the same wet film was dried at 50° C., it reached the same level of opacity but with somewhat higher gloss, better adhesion and fewer defects. This dry film remained fully opaque with no to visible change until heated to 63° C., whereupon it changed dramatically in about one minute, completely revealing the black chart background with no trace of opacity remaining, now adhering to the chart even more strongly than before though not quite as tough as the clear film formed when the coating is dried at 74° C. When cooled back to room temperature, the film was non-tacky, remained fully transparent and could be bent over a ⅛" mandrel without cracking.

Example (7)

Crystalline polymer: 350-124 is a 0.72 micron median particle size anionic crystalline polymer emulsion at 51.0%

NV solids neutralized with ammonia to pH 7.0 in 83:17 water:n-propanol with a viscosity of 28 centipoise. The dry polymer, based on a mixture of 93% docosyl acrylate, 4% 2-ethylhexyl acrylate, 2.5% methacrylic acid and 0.5% 1,6-hexanediol diacrylate, exhibits a strong endotherm at 53° C. when tested by DSC at a 10° C./min heating rate. When coated with 3 wet mils Bird film applicator on a black Leneta chart, the opaque white emulsion dried at room temperature to opaque white matte film that is easily rubbed from the chart to a flaky powder. The opaque film, when heated for 5 minutes in a 50° C. oven, remained visibly unchanged until the temperature was increased to 54° C. where it lost opacity but the residue appeared hazy due to the poorly adherent dense pattern of 0.1-0.2 mm in a film that turned brittle on cooling. When the same wet film was dried in the 74° C. oven, it immediately lost opacity and became a nearly transparent but visibly cracked adherent film which was brittle on cooling that scratched easily but was somewhat difficult to rub off.

Example (8)

Thermochromic coating: 349-20 is an irreversible thermochromic coating formulated from the crystalline polymer emulsion 350-124 described in example (7). 136.9 gr of binding polymer N-484 was stirred into 802.9 gr of 350-124 emulsion and followed with 26.0 gr of Acrysol TT-935 thickener pre-diluted with 20.8 gr of water. To this mixture was added 1.0 gr of Tego Foamex 1488 antifoam and finally 10.6 gr of 14% aqueous ammonia to neutralize and activate the thickener. The resulting coating formulation equilibrated overnight to 1010 centipoise viscosity at 48.5% NV solids and pH 8.5. The polymer portion of this coating is comprised of 83.5% crystalline polymer, 14.8% binding polymer and 1.7% thickener polymer, or a ratio of 5.7 to 1 of crystalline to binding polymer. This coating appeared very much like 349-19 in example (6), with comparable opacity when wet and dry, though with no visible defects even when dried at room temperature. It remained opaque even when dried at 50° C. but, as expected, the dry film became transparent on heating to 54° C. and remained so when cooled back to room temperature. The cooled film was more rigid but still flexible, non-tacky and easily handled without damage Example (9)

Crystalline polymer emulsion: 350-112 is a 0.76 micron median particle size anionic emulsion at 51.0% NV at pH 4.8 in 83:17 water:n-propanol with a viscosity of 28 centipoise. The dry lightly crosslinked polymer, based on a mixture of 93% docosyl acrylate, 4% 2-ethylhexyl acrylate, 2.5% methacrylic acid and 0.5% 1,6-hexanediol diacrylate, exhibits a strong endotherm at 62° C. when tested by DSC at a 10° C./min heating rate. When coated with #60 Meyer rod on a black Leneta chart, the opaque white emulsion dries at room temperature to opaque white but badly cracked film that is easily rubbed from the chart to a fine, flaky powder. This dry white polymer deposit, when heated for 2 minutes in a 70° C. oven, became mostly transparent and showed a dense pattern of 0.1-0.2 mm cracks in a brittle film. The refractive index of this transparent but somewhat cracked film was tested using an ATAGO R5000 hand refractometer. The index at 30° C. measured at about 1.50 in its crystalline state. The instrument could not, however, be heated safely to 65° C. to measure it in the amorphous state. Uncrosslinked crystalline polymers made with similar composition (from octadecyl acrylate monomer) have been tested for refractive index giving a 1.46 index in their amorphous (melted) state.

Example (10)

Crystalline polymer powder: 350-205A is a powdered solid prepared from crystalline emulsion polymer 350-112 described in Example (1). 225 gr of 350-112 emulsion was chilled to 10° C., poured into a chilled metal baking pan and the pan placed in a vacuum chamber over a bucket of dry ice. The polymer was freeze dried without agitation in this manner at 30 in Hg vacuum for 17 hours. The dry, white flaky residue was removed and placed in a pre-chilled Waring blender and pulverized for 1 minute at high speed. This powder was used to prepare several experimental reversible coatings. The 350-205A powder was also suspended separately in methanol, sheared for 30 sec with a Virtis homogenizer and tested for particle size distribution with a Horiba LA-910 laser light scattering analyzer. The result indicated about 30% of the particles remained at 0.7 microns with the remaining agglomerates distributed between 3 and 30 microns.

Example (11)

Reversible coating: 6.67 gr of Silgard 184, a dimethylsilicone based elastomer base resin from Dow Corning, was mixed with 4.0 gr 350-205A, the powdered crystalline polymer from example (2), and 0.66 gr of Silgard 184 silicone curing agent plus additional platinum catalyst in the form of 6 drops Syl-Off 4000 (Platinum/vinyl siloxane based catalyst also from Dow Corning). The blend was mixed briefly with a spatula and then with Virtis homogenizer until free of lumps. The coating cured in 2 hours at room temperature to a grainy white rubbery film. The coating was heated to 70° C. and it lost some but not all of its opacity when hot. On cooling back to room temperature the original degree of opacity returned. The incomplete transparency shown in the heated state is presumably due to a refractive index mismatch between the 1.43 RI silicone and the 1.46 RI crystalline polymer.

Example (12)

Reversible coating: 6.03 gr of 350-112 crystalline polymer emulsion described in example (1) was diluted with 7.03 gr methanol and stirred in 0.12 gr Silwet L-77 (Polyalkylene modified heptamethyltrisiloxane—Osi Specialties). Added this smooth polymer suspension to 10.0 gr PDV-1631, a vinyl terminated diphenyl siloxane-dimethyl siloxane copolymer from Gelest with 16% diphenyl for a refractive index of 1.465. This siloxane/polymer mixture was homogenized for 1 minute using a Virtis hand-held homogenizer to a smooth white cream. To the creamy mixture was added 0.2 gr SIP6830.3, a divinyl tetramethyldisiloxane complex with 3% Pt from Gelest, followed by 0.25 gr SIP6826.0, a phenyltris (dimethysiloxy)silane crosslinker from Gelest. This catalyzed coating mixture, 349-56C, was homogenized for one minute, applied to a black Leneta chart and cured 4 hours in an oven at 50° C. The result, when cooled to room temperature, was a slightly opaque white rubbery film with some graininess from some agglomeration of the crystalline polymer powder. On heating to 70° C., the film became almost completely transparent and on cooling again to room temperature, it regained opacity. In this example, we have a better match between the 1.465 RI silicone and the 1.46 RI crystalline polymer.

Examples (13)

Reversible Coating

A coating composition was made by mixing 48% by weight of Sylgard184 (a Dow Corning silicone resin), 3% by weight of Sylgard 184 Dow Corning curing agent, 48% by weight of Polywax 655 from Baker Petrolite (Tp about 100° C.), which had been micronized to a particle size of 3-10µ, and 1% by weight of platinum. The coating composition was mixed with a homogenizer, knife coated on black paper to form a film. 0.001 inch (about 5.4µ) thick, and cured. When the resulting coated paper was heated with a heat gun to a temperature above 100° C., the coating became substantially transparent. On cooling, the coating again became opaque. This cycle could be repeated.

What we claim is:

1. An assembly which comprises
   (1) a substrate which comprises a temperature-sensitive product, and
   (2) a temperature indicator which
      (a) comprises a first component comprising a side chain crystalline (SCC) polymer which (i) has a crystalline melting point, Tp, of 0-135° C., and (ii) is not cross-linked
      (b) undergoes a change in translucency, wherein the change first occurs at a temperature that is less than 5 degrees C. above Tp and wherein the change in the indicator remains when the temperature is reduced below Tp, wherein the SCC polymer is in the form of solid particles having a median particle size greater than 0.03µ and less than 10µ; and
      (c) comprises a second component, wherein the difference between the refractive index of the SCC polymer and the second component is greater at a temperature below Tp than at a temperature above Tp, wherein the second component comprises air voids or a matrix polymer.

2. An assembly according to claim 1 wherein the SCC polymer is a copolymer of two or more comonomers, and comprises repeating units in which the side chains comprise linear polymethylene radicals containing 16-30 carbon atoms.

3. An assembly according to claim 1 wherein the SCC polymer is a copolymer comprising repeating units containing an n-alkyl group which contains 12, 14, 16 or 18 carbon atoms.

4. An assembly according to claim 1 wherein the SCC polymer is a copolymer which consists essentially of repeating units containing an n-alkyl group which contains 12, 14, 16 or 18 carbon atoms.

5. An assembly according to claim 1 wherein the SCC polymer is a copolymer which consists essentially of units derived from (a) the n-alkyl acrylate in which the n-alkyl group contains 12 carbon atoms and (b) the n-alkyl acrylate in which the n-alkyl group contains 16 carbon atoms.

6. An assembly according to claim 1 wherein the SCC polymer consists essentially of units derived from
   (I) at least 50% by weight of at least one n-alkyl acrylate or methacrylate in which the n-alkyl group contains 12-50 carbon atoms, and
   (ii) less than 50% by weight of at least one alkyl acrylate or methacrylate in which the alkyl group is not an alkyl group containing 12-50 carbon atoms.

7. An assembly according to claim 1 wherein the temperature sensitive product is a vaccine and wherein the change in the indicator is in the translucency by heating the assembly above Tp.

8. An assembly according to claim 1 wherein the second component comprises air voids, the indicator further comprising a binder that is a polymer having a Tg at least 10° C. below the Tp of the SCC, wherein the temperature indicator undergoes an irreversible change.

9. An assembly which comprises
   (1) a substrate which comprises a vaccine, and
   (2) a temperature indicator which
      (a) comprises a side chain crystalline (SCC) polymer which
         (i) has a crystalline melting point, Tp, of 0-135° C.,
         (ii) is not cross-linked,
         (ii) is a copolymer of two or more comonomers, and
         (iv) comprises repeating units in which the side chains comprise linear polymethylene radicals containing 16-30 carbon atoms,
         (v) has a heat of fusion of at least 20 J/g, and
      (b) undergoes an irreversible change in translucency when exposed to a combination of time and temperature wherein the change first occurs when exposed to a temperature less than 5 degrees C. greater than Tp, wherein the change is in the translucency of the indicator and the change remains if the temperature is decreased below Tp after the change occurs, wherein the SCC polymer is in the form of solid particles having a median particle size greater than 0.03µ and less than 10µ; and
      (c) comprises a matrix polymer, wherein the difference between the refractive index of the SCC polymer and the matrix polymer is greater at a temperature below Tp than at a temperature above Tp.

10. An assembly according to claim 9 wherein the SCC polymer is a copolymer which comprises repeating units containing an n-alkyl group which contains 12, 14, 16 or 18 carbon atoms.

11. An assembly according to claim 9 wherein the SCC polymer is a copolymer which consists essentially of repeating units containing an n-alkyl group which contains 12, 14, 16 or 18 carbon atoms.

12. An assembly according to claim 9 wherein the SCC polymer is a copolymer which consists essentially of units derived from the n-alkyl acrylate in which the n-alkyl group contains 12 carbon atoms and the n-alkyl acrylate in which the n-alkyl group contains 16 carbon atoms.

13. An assembly according to claim 9 wherein the SCC polymer consists essentially of units derived from
   (I) at least 50% by weight of at least one n-alkyl acrylate in which the n-alkyl group contains 12-50 carbon atoms, and
   (ii) less than 50% by weight of at least one alkyl acrylate in which the alkyl group is not an alkyl group containing 12-50 carbon atoms.

14. An assembly which comprises
   (1) a substrate which comprises a temperature-sensitive product, and
   (2) a temperature indicator which
      (a) comprises a side chain crystalline (SCC) polymer which has a crystalline melting point, Tp, of 0-135° C.,
      (b) the SCC polymer is in the form of solid particles of a median particle size greater than 0.03µ and less than 10µ, and (c) comprises a matrix polymer, wherein the matrix polymer is a different polymer than the SCC polymer, the refractive index of the SCC polymer is at least 0.03 greater at a temperature below Tp than at a temperature above Tp and the difference between the refractive index of the SCC polymer and the matrix polymer is not more than 0.03 at a temperature below Tp.

15. An assembly according to claim 14 wherein the SCC polymer have a heat of fusion of at least 20 J/g.

16. An assembly according to claim 14 wherein the SCC polymer is a copolymer which consists essentially of units derived from (a) the n-alkyl acrylate in which the n-alkyl group contains 12 carbon atoms and (b) the n-alkyl acrylate in which the n-alkyl group contains 16 carbon atoms.

17. An assembly according to claim 14 wherein the SCC polymer has an average molecular weight of about 10,000 daltons.

18. An assembly according to claim 14 wherein one or both of the particles and the matrix polymer are crosslinked.

19. An assembly according to claim 18 wherein the temperature indicator is a coating on the substrate and the change in opacity is reversible.

\* \* \* \* \*